United States Patent
Lee

(10) Patent No.: US 6,434,387 B1
(45) Date of Patent: Aug. 13, 2002

(54) METHOD FOR CONTROLLING HANDOFF IN MOBILE COMMUNICATIONS SYSTEMS

(75) Inventor: Sang-Min Lee, Icheon (KR)

(73) Assignee: Hyundai Electronics Ind. Co., Ltd., Kyounggi-Do (CN)

(*) Notice: Subject to any disclaimer, the term of this patent is extended or adjusted under 35 U.S.C. 154(b) by 0 days.

(21) Appl. No.: 09/332,698

(22) Filed: Jun. 14, 1999

(30) Foreign Application Priority Data

Jun. 15, 1998 (KR) .............................. 98-22322

(51) Int. Cl.[7] .................................. H04Q 7/20
(52) U.S. Cl. .................. 455/436; 455/439; 370/331
(58) Field of Search ............................ 455/403, 422, 455/424, 425, 434, 436, 437, 438, 439, 440, 442; 370/331, 332, 310, 320

(56) References Cited

U.S. PATENT DOCUMENTS

| | | | | |
|---|---|---|---|---|
| 5,754,945 A | * | 5/1998 | Lin et al. | 455/33.4 |
| 5,805,995 A | * | 9/1998 | Jiang et al. | 455/436 |
| 5,940,743 A | * | 8/1999 | Sunnay et al. | 455/69 |
| 5,987,013 A | * | 11/1999 | Kabasawa | 370/331 |
| 6,075,989 A | * | 6/2000 | Moore et al. | 455/436 |
| 6,075,990 A | * | 6/2000 | Shin | 455/440 |
| 6,088,590 A | * | 7/2000 | Anderson et al. | 455/437 |
| 6,154,653 A | * | 11/2000 | Jung | 455/442 |
| 6,178,326 B1 | * | 1/2001 | Kalliokulju | 455/437 |
| 6,201,969 B1 | * | 3/2001 | Meier | 455/442 |

FOREIGN PATENT DOCUMENTS

| | | |
|---|---|---|
| JP | 10-98448 | 4/1998 |
| WO | PCT/US98/09305 | 5/1997 |
| WO | PCT/US98/02524 | 2/1998 |

* cited by examiner

Primary Examiner—William Trost
Assistant Examiner—Congvan Tran
(74) Attorney, Agent, or Firm—Bryan Cave LLP

(57) ABSTRACT

A method for controlling handoff in mobile communications systems, includes making base station output changes for a number of users into database to store it in an inner memory and detecting a number of channels in use for CDMA channels to store, measuring and storing pilot power strength of the base station in service and continuously detecting those of neighboring base stations, so that a pilot strength measurement message is transmitted if a pilot strength in the neighbor list of pilot offset lists of the mobile station exceeds a threshold value, analyzing the pilot strength measurement message to determine if it is handoff procedure or not, and instructing hard handoff if the handoff procedure is proved and adjusting traffic channel gain of a corresponding CDMA channel according to the number of users by using the base station output changes for the number of users to make service areas between the CDMA channels, so that the mobile station is assigned with forward power and code channels, wherein change of service area of the base station according to the increase of users may be obtained and traffic channel gain of CDMA channels in the dummy pilot method is appropriately changed to adjust the service area, so that successful handoff may be performed, reducing disconnection ratio of calls.

2 Claims, 3 Drawing Sheets

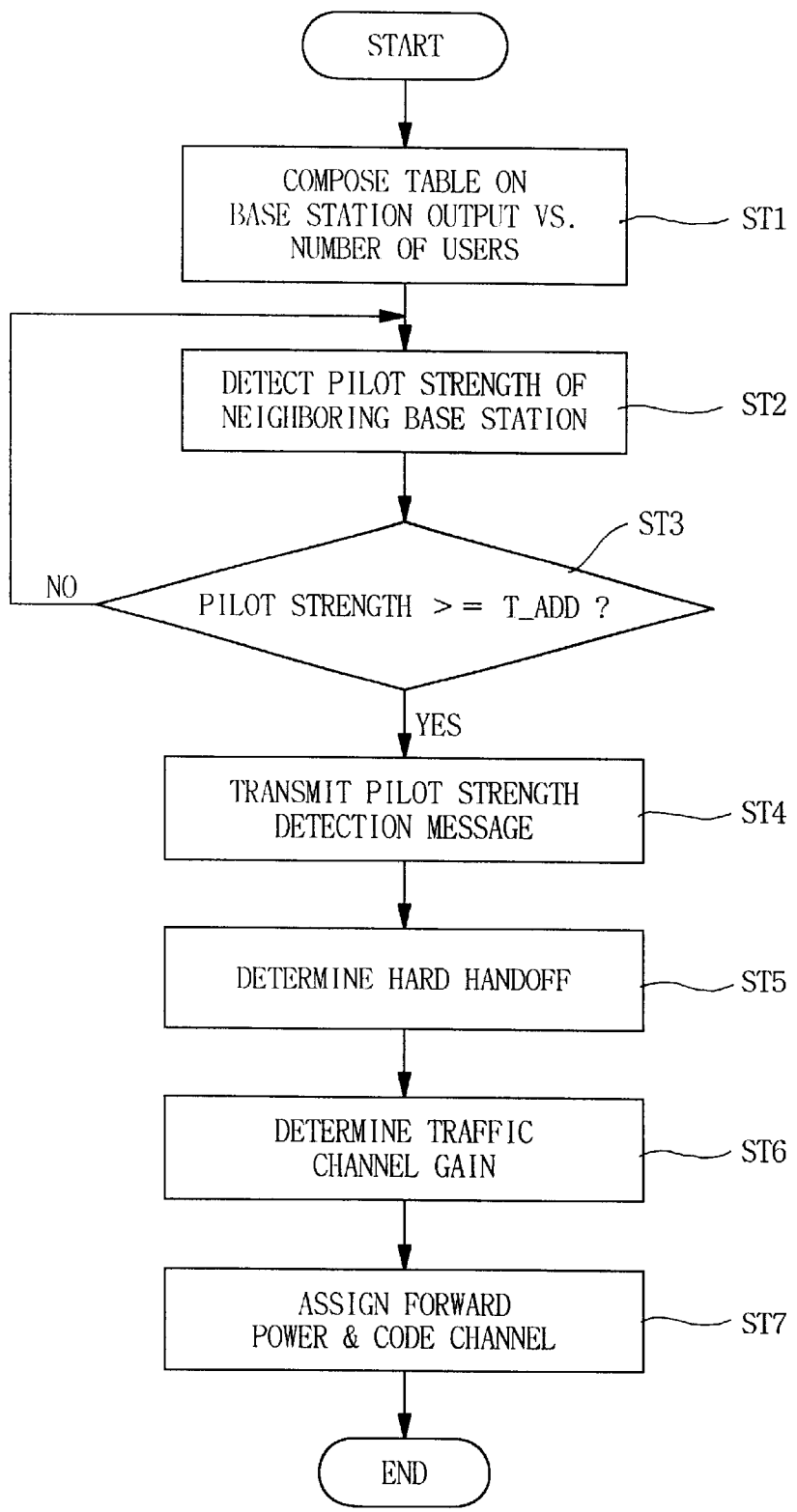

METHOD FOR CONTROLLING HANDOFF IN MOBILE COMMUNICATIONS SYSTEMS

BACKGROUND OF THE INVENTION

1. Field of the Invention

The present invention relates to a method for controlling handoff in mobile communications system, in which change of service area of a base station in response to increase of users is obtained and traffic channel gain of Code Division Multiple Access (CDMA) channels in dummy pilot method is appropriately changed to adjust service areas, so that successful handoff may be performed, reducing disconnection ratio of calls.

2. Description of the Conventional Art

FIG. 1 represents handoff boundary between base stations in a general mobile communications system.

In general, as shown in FIG. 1, cellular communications systems, personal communications systems, satellite communications systems and the like which are using the CDMA technology, have a boundary between coverage areas of two different base stations A and B, that is, a handoff area C exists between the base stations A and B.

In the handoff area, successful handoff has to be performed in order to maintain continuous communications (in order to prevent disconnection of a call) and prevent power loss.

FIG. 2 is a graph representing a handoff area between base stations in a general mobile communications system.

In the CDMA system, lists of base stations, which are expected as candidates for handoff, and handoff threshold values are transmitted to a mobile station. The mobile station detects not only pilot signal strength of a base station which is presently in service but also those of neighboring base stations which are the handoff candidates, and compares their pilot signal strengths with the threshold values.

In FIG. 2, the handoff area represents an area where the mobile station moves from when the pilot signal strength of the neighboring base station B exceeds a threshold value T_ADD to when a delay time T_TDROP lapses after that the pilot signal strength of the currently active base station A decreases below a threshold value T_DROP.

In the handoff area, efficient control for the handoff should be performed.

Looking into the conventional control method for the cellular mobile communications system using the CDMA technology, handoff failure usually happens when the mobile station moves from an overpopulated downtown area having many users to a suburb area having few users, due to the different base stations having the different number of CDMA channels.

In this case, in order to prevent the handoff failure, dummy pilot method is utilized, wherein there is no traffic channel and only overhead channels exist. That is, in the places, where different base stations having the different number of channels are adjacent to each other, dummy pilot is utilized to support hard handoff in order to save the hard handoff cost between the CDMA channels.

In other words, as shown in FIG. 1, the base station A has two channels FA0, FA1 and the base station B has a channel FA0, so that it is possible to use dummy pilot which has no traffic channel for the hard handoff and only the overhead channel.

However, increase in the number of users causes increase of the interruption and decrease of the service area of a base station. Therefore, the CDMA channel FA0 having traffic channels decreases a lot in its service area and the CDMA channel FA1 having no traffic channels has little change in its service area. Accordingly, there happens a difference in the service areas of the two base stations. At this time, if a user communicates in service area of the base station A using FA1 and moves to the service area of the base station B while communicating, the hard handoff happens, which is apt to be failed due to the difference of the service areas between the CDMA channels FA0 and FA1.

In other words, the conventional technique has disadvantages that the hard handoff is apt to be failed due to the difference of the service areas between the CDMA channel which uses the dummy pilot and the CDMA channel which does not use the dummy pilot, since the service area of a base station decreases, as the number of users increases.

Further, the conventional technique has disadvantages that the call connection may be failed even in case that the user tries to communicate in the handoff area D between the base stations A and B.

SUMMARY OF THE INVENTION

The present invention is derived to resolve the disadvantages of the conventional techniques and it is an object of the present invention to provide a method for controlling handoff in mobile communications system, in which hard handoff may be performed successfully and call disconnection may be prevented by obtaining change in the service areas of base stations according to the increase of the number of users and adjusting the service area by changing traffic channel gains of CDMA channels having the dummy pilot.

In order to achieve the above objects of the present invention, a method for controlling handoff in mobile communications systems, comprising the steps of a first step, in a base station, for making output changes from the base station for a number of users into database to store the database in an inner memory and detecting a number of channels which are in use for Code Division Multiple Access (CDMA) channels to store the number in the inner memory, a second step, in a mobile station, for measuring and storing pilot power strength of a base station, which is currently in service, and continuously detecting pilot power strength of neighboring base stations, so that a pilot strength measurement message is transmitted if a pilot strength, which is included in a neighbor list of pilot offset lists of the mobile station, exceeds a threshold value, a third step, in the base station, for analyzing the transmitted pilot strength measurement message to determine as to whether it is handoff procedure or not; and a fourth step, in the base station, for instructing hard handoff if handoff procedure is determined in the third step and adjusting traffic channel gain of a corresponding CDMA channel according to the number of users by using the change of output from the base station for the number of users, which is stored in the first step, to make service areas between the CDMA channels, so that the mobile station is assigned with forward power and code channels, wherein in the fourth step, the adjustment of the traffic channel gain of the traffic channels is performed in such a manner that traffic channel gain from the CDMA channels increases as the number of users increases.

BRIEF DESCRIPTION OF THE DRAWINGS

The present invention will become more fully understood from the detailed description given hereinbelow accompanying drawings which are given by way of illustration only, and thus are not limitative of the present invention, and wherein:

FIG. 4 is a flow chart for explaining a method for controlling handoff in mobile communications systems according to the present invention.

DETAILED DESCRIPTION OF THE INVENTION

A method for controlling handoff in mobile communications systems, according to an embodiment of the present invention will now be explained with reference to the accompanying drawings.

Figure 1:
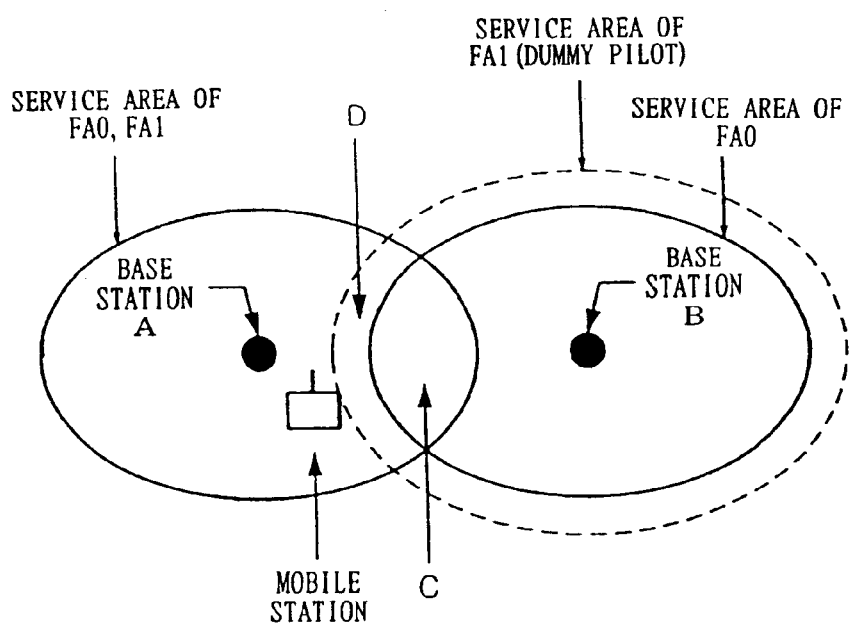
FIG. 1 is a schematic view showing a handoff boundary between base stations in a general mobile communications system.
Figure 2:
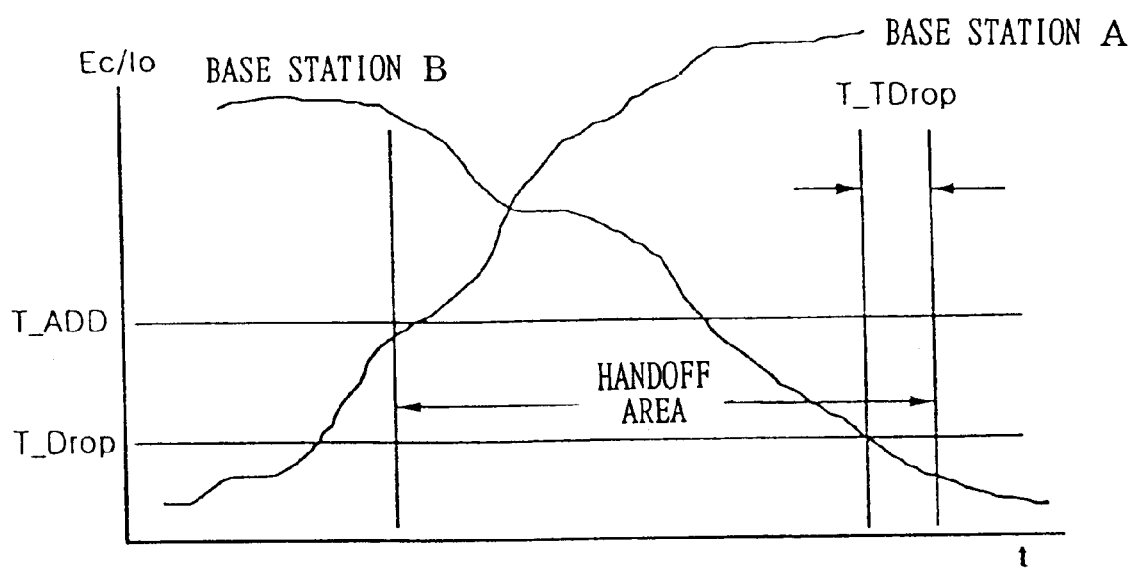
FIG. 2 is a schematic view showing a handoff area between the base stations in the general mobile communications system.
Figure 3:
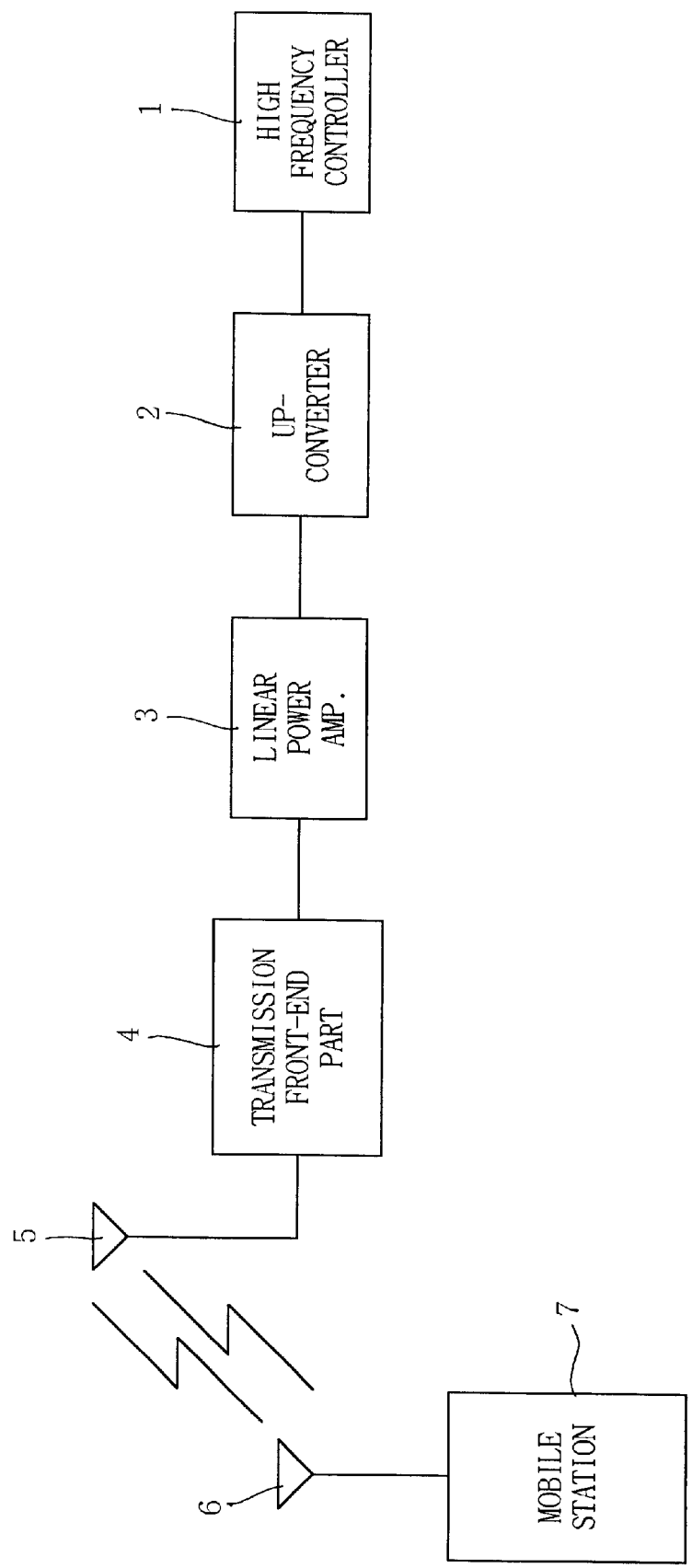
FIG. 3 is a schematic block diagram showing the construction of the mobile communications system adopted in the present invention.

FIG. 3 is a schematic block diagram showing the construction of the mobile communications system adopted in the present invention.

In FIG. 3, the mobile communications system, which is adopted in the present invention, includes a control station including a high frequency controller 1 to output an intermediate frequency to transmit to a mobile station 7, an up-converter 2 for converting the intermediate frequency of 4.95 MHz, which is output from the high frequency controller 1, to a UHF signal, a linear power amplifier 3 for amplifying the UHF signal obtained in the up-converter 2 into a predetermined level, a transmission front-end part 4 for controlling a transmission signal obtained from the linear power amplifier 3 into CDMA frequency bandwidth to transmit it to a transmitting/receiving antenna 5, and a mobile station 7 which transmits/receives data to/from the base station via a transmitting/receiving antenna 6.

Now, the operation of the mobile communications system according to an embodiment of the present invention will be described in more detail.

First of all, the high frequency controller 1 in the base station generates intermediate frequency of a signal to transmit. The up-converter 2 converts the intermediate frequency signal of 4.95 MHz to a UHF signal and transmits it to the linear power amplifier 3. The linear power amplifier 3 amplifies the input UHF signal into a proper level and transmits it to the transmission front-end part 4. The transmission front-end part 4 limits the UHF signal to CDMA frequency bandwidth, that is, 1.23 MHz by using a wideband pass filter and transmits it to the mobile station via a transmission terminal.

In this case, it is possible to control outputs of the base station by changing noise figure by means of a flower attenuator of the up-converter 2. Also, the output value from the base station corresponding to the change of numbers of the users may be obtained from the calculation of the base station noise.

FIG. 4 is a flow chart showing a method for controlling handoff in the mobile communications systems according to the present invention.

As shown in FIG. 4, a method for controlling handoff in mobile communications systems, includes the steps of, for base station's making the change of output from the base station for the number of users into database to store it in an inner memory and detecting a number of channels which are in use for Code Division Multiple Access (CDMA) channels to store it in the inner memory (step ST1), for mobile station's measuring and storing pilot power strength of a base station, which is currently in service, and continuously detecting pilot power strength of neighboring base stations, so that a pilot strength measurement message is transmitted if a pilot strength, which is included in the neighbor list among pilot offset lists of the mobile station, exceeds a threshold value (steps ST2–ST4), for base station's analyzing the transmitted pilot strength measurement message to determine as to whether it is handoff procedure or not and for instructing hard handoff if handoff procedure is determined in the third step and adjusting traffic channel gain of a corresponding CDMA channel according to the number of users by using the change of output from the base station for the number of users, which is stored in the first step, to make service areas between the CDMA channels, so that the mobile station is assigned with forward power and code channels (steps ST5–ST7).

First of all, in step ST1, BTS control block (BCP) in the base station composes a table on the change of output from the base station with relation to the number of users and store it in the internal memory. That is, the table represents the change of the base station output in which traffic channel output relatively increases as the number of users increases. The table is formed into database and stored in the internal memory. Further, in step ST1, the BCP in the base station grasps how many channels are engaged in the respective CDMA channels (frequency assignment: FA) and stores a number of channels in the internal memory.

The mobile station measures pilot power strength of a base station which is currently in service, and continuously detects pilot power strengths of neighboring base stations, so that a pilot strength measurement message is transmitted to the base station if a pilot strength, which is included in the neighbor list in the pilot offset lists of the mobile station, exceeds a threshold value (T_ADD) in steps ST2–ST4.

In step ST5, a call control process CCP of the base station analyzes the transmitted pilot strength measurement message PSMM and determines whether it is hard handoff procedure or not. If it is determined hard handoff, the base station instructs the mobile station of hard handoff.

In step ST6, the CCF in the base station calculates the number of users in case of hard handoff to determine a traffic channel gain of a corresponding CDMA channel.

In this case, the traffic channel gain of the corresponding CDMA channel with relation to the number of users has been already prepared in forms of database in step ST1, the traffic channel gain may be easily determined by calculation of the number of users.

Next, in step ST7, the mobile station is assigned with forward power and code channels according to the traffic channel gains of the CDMA channel which has been determined in step ST6, thereby achieving the hard handoff between frequencies.

EFFECT OF THE INVENTION

As described hereinabove, according to the present invention, hard handoff between channels may be performed successfully and call disconnection may be prevented by adjusting the service areas between CDMA channels according to the increase of the number of users.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A method for controlling handoff in mobile communications systems, comprising the steps of:

a first step, in a base station, for making output changes from the base station for a number of users into database to store the database in an inner memory and detecting a number of channels which are in use for Code Division Multiple Access (CDMA) channels to store the number in the inner memory;

a second step, in a mobile station, for measuring and storing pilot power strength of a base station, which is currently in service, and continuously detecting pilot power strength of neighboring base stations, so that a pilot strength measurement message is transmitted if a pilot strength, which is included in the neighbor list among pilot offset lists of the mobile station, exceeds a threshold value;

a third step, in the base station, for analyzing the transmitted pilot strength measurement message to determine as to whether it is handoff procedure or not;

a fourth step, in the base station, for instructing hard handoff if handoff procedure is determined in the third step and adjusting traffic channel gain of a corresponding CDMA channel according to the number of users by using the change of output from the base station for the number of users, which is stored in the database in the first step, to adjust the service areas between the CDMA channels; and, a fifth step, in the base station, for assigning the mobile station with forward power and code channels.

2. A method for controlling handoff in mobile communications systems, as claimed in claim 1, wherein in the fourth step, the adjustment of the traffic channel gain of the traffic channels is performed in such a manner that traffic channel gain from the CDMA channels increases as the number of users increases.

* * * * *